US008024184B2

(12) United States Patent
Takiguchi et al.

(10) Patent No.: US 8,024,184 B2
(45) Date of Patent: Sep. 20, 2011

(54) SPEECH RECOGNITION DEVICE, SPEECH RECOGNITION METHOD, COMPUTER-EXECUTABLE PROGRAM FOR CAUSING COMPUTER TO EXECUTE RECOGNITION METHOD, AND STORAGE MEDIUM

(75) Inventors: Tetsuya Takiguchi, Kanagawa-Ken (JP); Masafumi Nishimura, Kanagawa-Ken (JP)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 12/476,650

(22) Filed: Jun. 2, 2009

(65) Prior Publication Data
US 2009/0306977 A1  Dec. 10, 2009

Related U.S. Application Data

(63) Continuation of application No. 10/849,724, filed on May 20, 2004, now abandoned.

(30) Foreign Application Priority Data

May 21, 2003  (JP) .................................. 2003-143224

(51) Int. Cl.
*G19L 21/02* (2006.01)
(52) U.S. Cl. ..................... 704/227; 704/244; 704/243
(58) Field of Classification Search .................. 704/256, 704/234, 231, 235, 243, 244, 233, 246, 255, 704/227, 250
See application file for complete search history.

(56) References Cited

U.S. PATENT DOCUMENTS

| 5,956,679 A | * | 9/1999 | Komori et al. ................ 704/256 |
| 5,970,446 A | | 10/1999 | Goldberg et al. |
| 6,026,359 A | | 2/2000 | Yamaguchi et al. |
| 6,098,040 A | * | 8/2000 | Petroni et al. ................ 704/234 |

OTHER PUBLICATIONS

Takiguchi et al. "HMM-Separation-Based Speech Recognition for a Distant Moving Speaker" Pulished on IEEE Transactions on speech and audio processing, vol. 9, No. 2, Feb. 2001.*
Takiguchi, T.; Nakamura, S.; Shikano, K., "HMM-separation-based speech recognition for a distant moving speaker," *IEEE Transactions on Speech and Audio Processing*, Feb. 2001, pp. 127-140, vol. 9 No. 2.

* cited by examiner

*Primary Examiner* — Huyen X. Vo
(74) *Attorney, Agent, or Firm* — Wolf, Greenfield & Sacks, P.C.

(57) ABSTRACT

A speech recognition device and method configured to include a computer, for recognizing speech, including: a storage location for storing a feature quantity acquired from a speech signal for each frame; storage portions for storing acoustic model data and language model data; a echo speech component for generating echo speech model data from a speech signal acquired prior to a speech signal to be processed at the current time point and using the echo speech model data to generate adapted acoustic model data; and a processing component for utilizing the feature quantity, the adapted acoustic model data, and the language model data to provide a speech recognition result of the speech signal.

11 Claims, 9 Drawing Sheets

SPEECH RECOGNITION DEVICE, SPEECH RECOGNITION METHOD, COMPUTER-EXECUTABLE PROGRAM FOR CAUSING COMPUTER TO EXECUTE RECOGNITION METHOD, AND STORAGE MEDIUM

FIELD OF THE INVENTION

The present invention relates to speech recognition by a computer device, and in particular to a speech recognition device for sufficiently recognizing an original speech even when the original speech is superimposed with an echo generated by the environment, a speech recognition method, a computer-executable program for causing a computer to execute the control method, and a storage medium.

BACKGROUND OF THE INVENTION

As controllability of peripheral devices by a computer device has been improved, systems for automatically recognizing a speech inputted as a speech input from a microphone and the like are desirable. The above-mentioned speech recognition device for recognizing speech as input can be assumed to be utilized for various applications such as dictation of a document, transcription of minutes of a meeting, interaction with a robot, and control of an external machine. The above-mentioned speech recognition device essentially analyzes inputted speech to acquire a feature quantity, selects a word corresponding to the speech based on the acquired feature quantity, and thereby causes a computer device to recognize the speech. Various methods have been proposed to exclude influence from the environment, such as background noises, in performing speech recognition. A typical example is a method in which a user is required to use a hand microphone or a head-set type microphone in order to exclude echoes or noises which may be superimposed with the speech to be recorded and to acquire only the inputted speech. In such a method, a user is required to use such extra hardware as are not usually used.

One reason that a user is required to use the above-mentioned hand microphone or a head-set type microphone is that, if the speaker speaks away from a microphone, an echo may be generated depending on the environment, in addition to the influence of environmental noises. If an echo is superimposed onto an speech signal, in addition to noises, speech recognition mismatch is caused in a statistical model for each speech used in speech recognition (e.g., the hidden Markov model) which results in degradation of recognition efficiency.

FIG. 9 shows a typical method in which noises are taken into consideration when performing speech recognition. As shown in FIG. 9, if there is a noise, an inputted signal has a speech signal and output probability distribution in which the speech signal is superimposed with a noise signal. Since, in many cases, a noise occurs suddenly a method is employed in which a microphone for acquiring an input signal and a microphone for acquiring a noise are used and, with the use of a so-called two-channel signal, a speech signal and a noise signal are separately acquired from the input signal. A traditional speech signal shown in FIG. 9 is acquired from a first channel, and a noise signal is acquired from a second channel, so that, with a use of a two-channel signal, an original speech signal can be recognized from an inputted speech signal even under a noisy environment.

However, hardware resources of a speech recognition device are consumed by use of data for two channels, and in addition, a two-channel input may not be available in some cases. Therefore, the above method does not always enable efficient recognition. Furthermore, it may inconveniently restrict realistic speech recognition that information of the two channels is always required simultaneously.

Conventionally, as a method for coping with influence from a speech transfer route, the cepstrum mean subtraction (CMS) method has been employed. A disadvantage has been known that the CMS method is effective when the impulse response of a transfer characteristic is relatively short (several milliseconds to several dozen milliseconds), such as the case of influence of a telephone line, but is not sufficiently effective in performance when the impulse response of a transfer characteristic is longer (several hundred milliseconds), such as the case of an echo in a room. The reason for the disadvantage is that the length of the transfer characteristic of an echo in a room is generally longer than the window width (10 msec-40 msec) for a short-distance analysis used for speech recognition, and therefore the impulse response is not stable in the analysis interval.

As an echo suppression method in which short-interval analysis is not employed, there has been proposed a method in which multiple microphones are used and an inverse filter is designed to exclude echo components from a speech signal (M. Miyoshi and Y. Kaneda, "Inverse Filtering of room acoustics," IEEE Trans. on ASSP, Vol. 36, pp. 145-152, No. 2, 1988). This method has a disadvantage that the impulse response of an acoustic transfer characteristic may not be in the minimum phase; and, therefore it is difficult to design a realistic inverse filter. Furthermore, multiple microphones often may not be installed because of the cost and physical arrangement condition, depending on the intended use environment.

As a method for coping with an echo, various methods have been proposed such as an echo canceller disclosed in Published Unexamined Patent Application No. 2002-152093, for example. However, these methods require speech to be inputted with two channels and are not capable of coping with an echo encountered with one-channel speech input. As an echo canceller technique, the method and the device described in Published Unexamined Patent Application No. 9-261133 are known. However, the echo processing method disclosed in the Published Unexamined Patent Application No. 9-261133 is not a generalized method because it requires speech measurement at multiple places under the same echo environment.

As for speech recognition in which environmental noises are taken into consideration, it is possible to cope with noises using a method, such as a method of recognizing a speech under sudden noises by selecting an acoustic model for each frame, which is disclosed in Patent Application Specification No. 2002-72456 attributed to the common applicant, for example. However, an effective method related to speech recognition, which effectively utilizes the characteristic not of a suddenly generated noise but of an echo generated depending on an environment, has not been known.

A method of predicting an intra-frame transfer characteristic H to feed it back for speech recognition has been reported by T. Takiguchi, et al. ("HMM-Separation-Based Speech Recognition for a Distant Moving Speaker", IEEE Trans. on SAP, Vol. 9, pp. 127-140, No. 2, 2001), for example. In this method, a transfer characteristic H in a frame is used to reflect the influence of an echo; a speech input is inputted via a head-set type microphone as a reference signal; an echo signal is separately measured; and then, based on the result of the two-channel measurement, an echo prediction coefficient α for predicting an echo is acquired. Though a case is shown where echo influence is not taken into consideration at all, even when using the above method by Takiguchi et al., it is also shown that speech recognition with a sufficiently high accuracy can be performed in comparison with processing by a CMS method; however, this method does not enable speech recognition only from a speech signal measured in a hand-free environment.

If a user who does not use his hands or a user in an environment where a head-set type microphone can not be carried or worn is able to perform speech recognition, availability of speech recognition can be considerably extended. Furthermore, though the existing techniques described above are known, availability of speech recognition can be further extended if the speech recognition accuracy can be further improved in comparison with the existing techniques. For example, the above-mentioned environments include a case where processing is performed based on speech recognition when driving a vehicle or piloting a plane, or during movement within a large space, and a case where speech is inputted into a notebook-type personal computer or a microphone located at a distance for a kiosk device.

As described above, at least use of a head-set type microphone or a hand microphone is assumed in traditional speech recognition methods. However, with miniaturization of computer devices and expansion of applications, there is an increasing demand for a speech recognition method to be used in an environment where echoes must be taken into consideration and an increasing demand for enabling a hands-free speech recognition function even in an environment where echoes may be generated. In the present invention, the term "hands-free" is used to mean a condition in which a speaker can speak at any position without restriction by the position of a microphone.

SUMMARY OF THE INVENTION

The present invention has been made in consideration of the above-mentioned disadvantages of the conventional speech recognition. In the present invention, there is provided a method for coping with influence of an echo in a room by adapting an acoustic model used in speech recognition (hidden Markov model) to a speech signal in an echo environment. In the present invention, the influence of echo components in a short-interval analysis is estimated using a signal observed for input from one microphone (one channel). This method does not require an impulse response to be measured in advance, and enables echo components to be estimated based on the maximum likelihood estimation utilizing an acoustic model by using only a speech signal spoken at any place.

The present invention has been made based on the idea that it is possible to perform sufficient speech recognition not by actually measuring a speech signal superimposed with an echo or a noise (hereinafter referred to as a "speech model affected by intra-frame echo influence" in the present invention) with the use of a head-set type microphone or a hand microphone, but by expressing it with an acoustic model used for speech recognition to estimate an echo prediction coefficient based on the maximum likelihood reference.

When an echo is superimposed, the inputted speech signal and the acoustic model are different only by the echo. The present invention has been made based on the finding that, in consideration of the long impulse response, an echo can be sufficiently simulated even if the echo is assumed to be superimposed onto a speech signal $O(\omega; t)$, which is being determined at the current time point, while being dependent on a speech signal $O(\omega; tp)$ in a frame in the past. In the present invention, an echo can be defined as an acoustic signal which influences a speech signal for a longer time than an impulse response, the signal which gives the echo being a speaking voice giving the speech signal. Though it is not required to define an echo more clearly in the present invention, when seen in connection with the time width of an observation window to be used, it can be basically defined as an acoustic signal which gives influence longer than the time width of the observation window.

In this case, acoustic model data (an HMM parameter and the like), which is usually used as an acoustic model, can be regarded as a reference signal with a high accuracy, related to a phoneme generated with a speech corpus and the like. A transfer function H in a frame can be predicted with sufficient accuracy based on an existing technique. In the present invention, a "speech model affected by intra-frame echo influence" equivalent to a signal which has been conventionally inputted separately as a reference signal is generated from an acoustic model with the use of additivity of a cepstrum. Furthermore, an echo prediction coefficient $\alpha$ can be estimated so that a selected speech signal is given the maximum probability. The echo prediction coefficient is used to generate an adapted acoustic model which has been adapted to an environment to be used by a user, in order to perform speech prediction. According to the present invention, speech input as a reference signal is not required, and it is possible to perform speech recognition using only a speech signal from one channel. Furthermore, according to the present invention, it is possible to provide a robust speech recognition device and speech recognition method to cope with an echo influence problem which may be caused when a speaker speaks away from a microphone.

That is, according to the present invention, there is provided a speech recognition device configured to include a computer, for recognizing a speech; the speech recognition device comprising: a storage area for storing a feature quantity acquired from a speech signal for each frame; storing portions for storing acoustic model data and language model data, respectively; an echo adaptation model generating portion for generating echo speech model data from a speech signal acquired prior to a speech signal to be processed at the current time point and using the echo speech model data to generate adapted acoustic model data; and recognition processing means for referring to the feature quantity, the adapted acoustic model data and the language model data to provide a speech recognition result of the speech signal.

The adapted acoustic model generating means in the present invention can comprise: a model data area transforming portion for transforming cepstrum acoustic model data into linear spectrum acoustic model data; and an echo prediction coefficient calculating portion for adding the echo speech model data to the linear spectrum acoustic model data to generate an echo prediction coefficient giving the maximum likelihood.

The present invention comprises an adding portion for generating echo speech model data, and the adding portion can add the cepstrum acoustic model data of the acoustic model and cepstrum acoustic model data of an intra-frame transfer characteristic to generate a "speech model affected by intra-frame echo influence".

The adding portion in the present invention inputs the generated "speech model affected by intra-frame echo influence" into the model data area transforming portion and causes the model data area transforming portion to generate linear spectrum acoustic model data of the "speech model affected by intra-frame echo influence".

The echo prediction coefficient calculating portion in the present invention can use at least one phoneme acquired from an inputted speech signal and the echo speech model data to maximize likelihood of the echo prediction coefficient based on linear spectrum speech model data. The speech recognition device in the present invention preferably performs speech recognition using a hidden Markov model.

According to the present invention, there is provided a speech recognition method for causing a speech recognition device configured to include a computer, for recognizing a speech, to perform speech recognition; the method causing the speech recognition device to execute steps of: storing in a storage area a feature quantity acquired from a speech signal for each frame; reading from the storing portion a speech signal acquired prior to a speech signal to be processed at the current time point to generate echo speech model data and processing speech model data stored in a storing portion to generate adapted acoustic speech model data and store it in a storage area; and reading the feature quantity, the adapted acoustic model data and language model data stored in a storing portion to generate a speech recognition result of the speech signal.

According to the present invention, the step of generating the adapted acoustic model data can comprise: an adding portion calculating the sum of the read speech signal and an intra-frame transfer characteristic value; and causing a model data area transforming portion to read the sum calculated by the adding portion to transform cepstrum acoustic model data into linear spectrum acoustic model data.

The present invention can comprise a step of causing an adding portion to read and add the linear spectrum acoustic model data and the echo speech model data to generate an echo prediction coefficient giving the maximum likelihood. In the present invention, the step of transformation into the linear spectrum acoustic model data can comprise a step of causing the adding portion to add the cepstrum acoustic model data of the acoustic model data and cepstrum acoustic model data of an intra-frame transfer characteristic to generate a "speech model affected by intra-frame echo influence".

The step of generating the echo prediction coefficient in the present invention can comprise a step of determining the echo prediction coefficient so that the maximum likelihood is given to at least one phoneme for which the sun value of the linear spectrum echo model data of the "speech model affected by intra-frame echo influence" and the echo speech model data, which has been generated by the adding portion and stored.

In the present invention, there are provided a computer-readable program for causing a computer to execute the above-mentioned speech recognition methods and a computer-readable storage medium storing the computer-readable program.

BRIEF DESCRIPTION OF THE DRAWINGS

The invention will hereinafter be described in greater detail with reference to the appended drawings wherein.

DETAILED DESCRIPTION OF THE INVENTION

Figure 1:
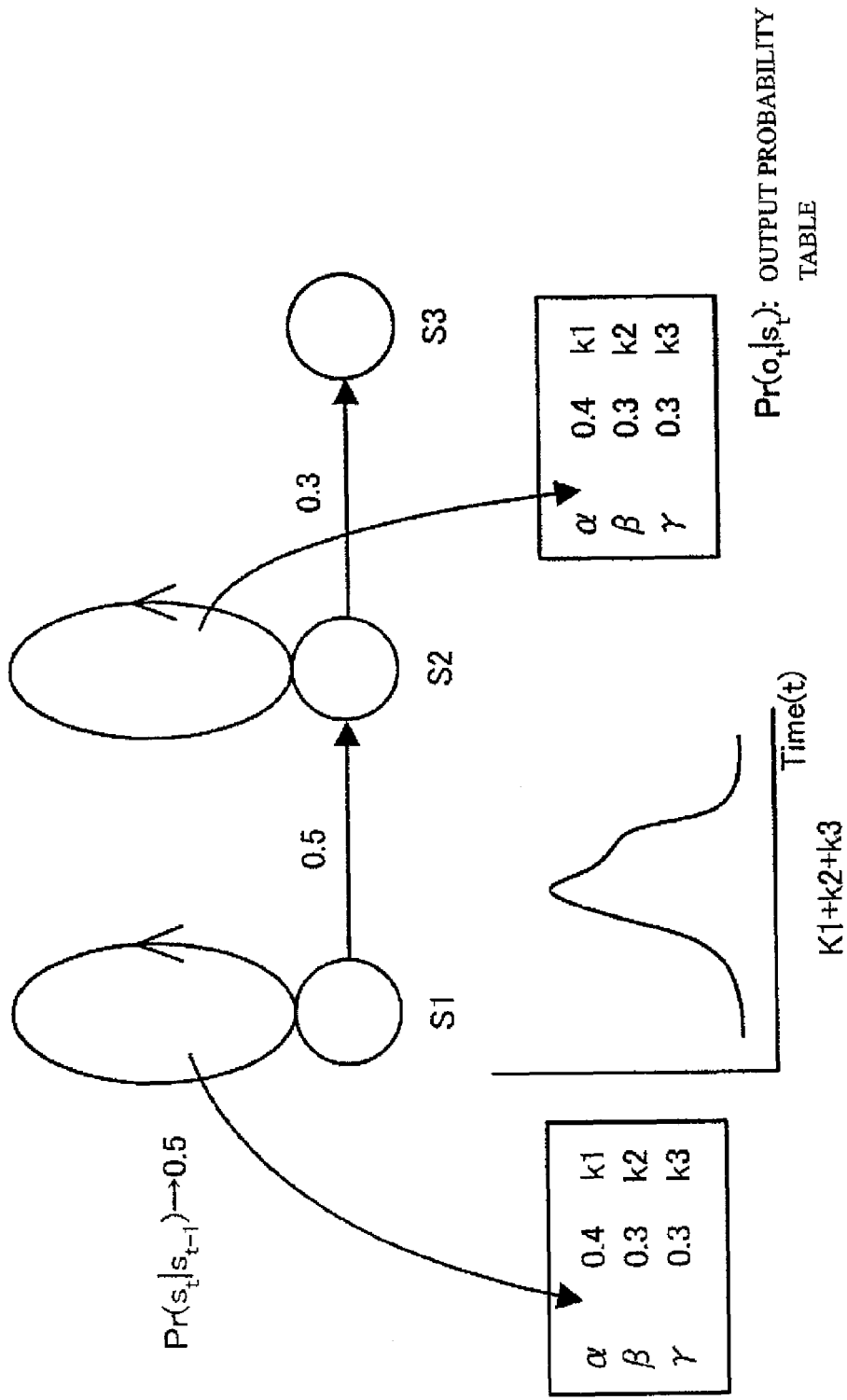
FIG. 1 schematically illustrates speech recognition using a hidden Markov model (HMM)

The present invention is now described according to the embodiment shown in the drawings. The present invention, however, is not limited to the embodiment described below.

A. Summary of Speech recognition using a Hidden Markov Model

FIG. 1 schematically illustrates speech recognition using a hidden Markov model (HMM) to be used in the present invention. An acoustic model can be regarded as an automaton in which a word or a sentence is constructed as a sequence of phonemes; three states are typically provided for each phoneme; and a transition probability among these states is specified so that a word or a sentence composed of a sequence of phonemes can be retrieved. In the embodiment shown in FIG. 1, there are illustrated three phonemes S1 to S3. The transition probability Pr(S1|S0) from the state S1 to S2 is shown as 0.5, and the transition probability Pr(S3|S2) is shown as 0.3.

An output probability to be determined in association with a phoneme given by mixed Gaussian distribution, for example, is assigned to each of the states S1 to S3. In the embodiment shown in FIG. 1, it is shown that mixed elements k1 to k3 are used for the states S1 to S3. FIG. 1 also shows an output probability distribution of mixed Gaussian distribution for the state S1, shown as k1 to k3. The mixed elements are provided with weights w1 to w3, respectively, to be suitably adapted to a particular speaker. When the above-mentioned acoustic model is used, the output probability is defined to be given by Pr(O|λ), where "O" of alphabet is a speech signal and λ is a set of HMM parameters.

Figure 2:
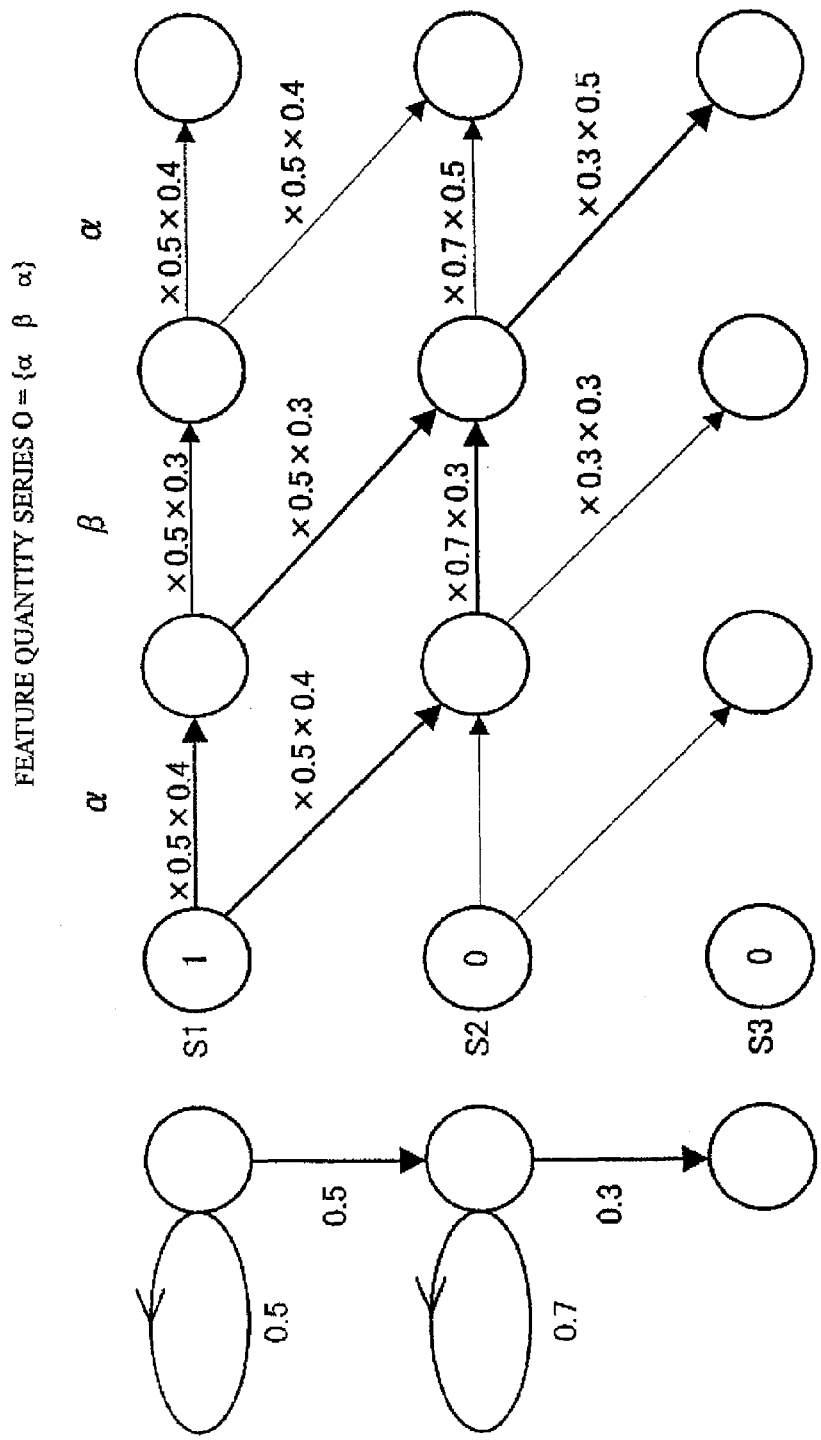
FIG. 2 schematically illustrates a process for forming an output probability table based on each state for a speech signal.

FIG. 2 shows a process for generating an output probability table according to the present invention. In the embodiment shown in FIG. 2, the output probability from the state S1 to the state S3 can be calculated by composing a trellis as shown in FIG. 2 using a feature quantity series {α β α} acquired from a speech signal and using an algorithm such as a Viterbi algorithm, a forward algorithm, a beam-search algorithm and the like. More generally, an output probability for a speech signal based on each state can be given as an output probability table, where t is a predetermined frame, Ot is a speech signal at the predetermined frame t, s is a state, λ is a set of HMM parameters.

[Equation 1]

$$Pr(O \mid \lambda) = \sum_{allS} \prod_{t=1}^{T} Pr(o_t \mid s_t, s_{t-1}, \lambda) Pr(s_t \mid s_{t-1}, \lambda) \quad (1)$$

l

In speech recognition using HMM, by using the above-mentioned output probability table to retrieve a phoneme string with the maximum likelihood, the output result, that is, a word or a sentence is determined. Though each state is described by Gaussian distribution, the state between the first phoneme and the last phoneme is determined by the likelihood based on the state transition probability. As for typical speech recognition using HMM, "digital signal processing for speech and sound information" by Shikano et al. (Shoko-do, ISBN 4-7856-2014) can be referred to, for example.

Figure 3:
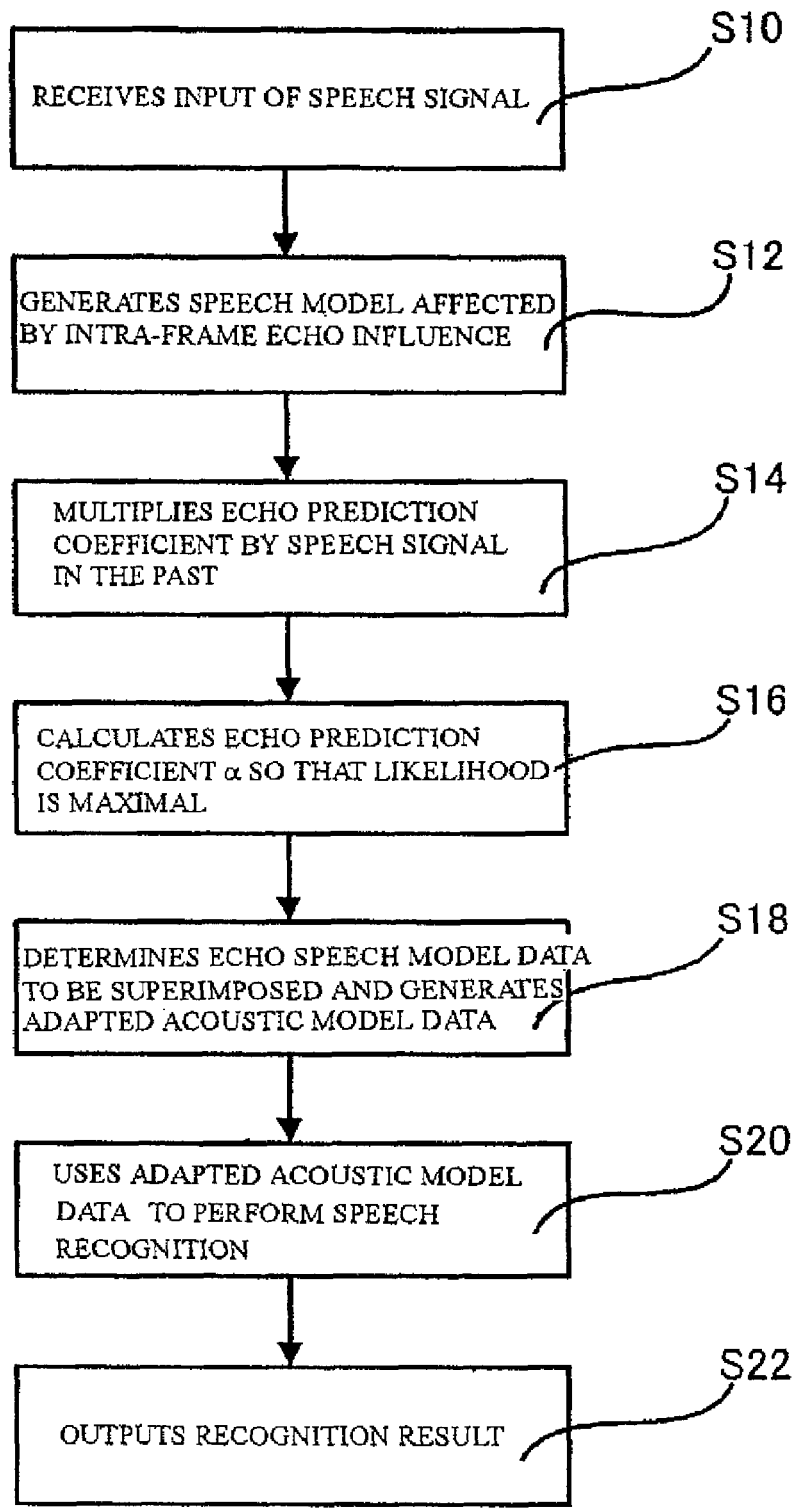
FIG. 3 is a flowchart showing a schematic procedure for a speech recognition method of the present invention.

B. Process in a Speech Recognition Method According to the Present Invention FIG. 3 shows a flowchart showing a schematic procedure of a speech recognition method of the present invention. As shown in FIG. 3, the process of the speech recognition method of the present invention receives input of a speech signal at step S10, and, at S12, generates from acoustic model data and an intra-frame transfer characteristic a "speech model affected by intra-frame echo influence" At step S14, an echo prediction coefficient α and a speech signal in the past are used to generate echo speech model data (α×O {w; tp}).

The generated echo speech model data is, at step S16, added to the "speech model affected by intra-frame echo influence" given at step S12 as linear spectrum acoustic model data, and then an echo prediction coefficient α is so determined that the maximum likelihood value can be obtained for a selected word or sentence obtained by processing the speech signal. At step S18, the determined echo prediction coefficient α and the speech signal O(ω; tp) in a frame in the past are used to acquire the absolute value of an echo. The absolute value is added to the mean value vector μ of the speech model affected by inter-frame echo influence to calculate μ'=μ+α×O(ω; tp). A speech model which also includes outer-frame echo components is generated and stored as a set with other parameters. After that, at step S20, the speech signal and the adapted acoustic model data are used to perform speech recognition, and at step S22, the recognition result is outputted.

Figure 4:
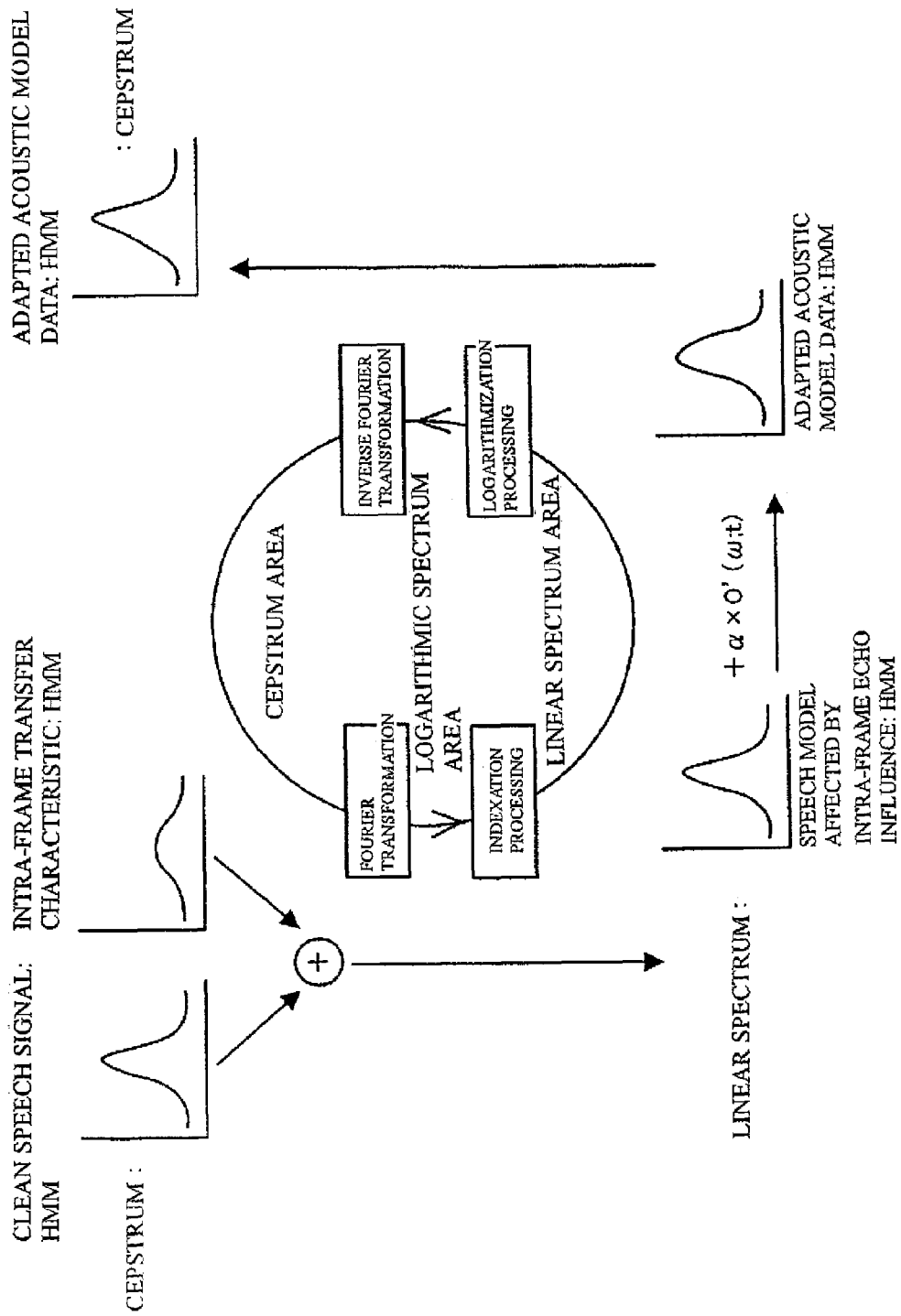
FIG. 4 shows schematic processing in the process described in FIG. 3.

FIG. 4 shows a schematic process for the processing described with reference to FIG. 3 of the present invention. First, acoustic model data and a cepstrum of an intra-frame transfer characteristic are added to create data of a "speech model affected by intro-frame echo influence". By applying a method such as discrete Fourier transformation and indexation processing, the generated speech model data is transformed into linear spectrum acoustic model data. Furthermore, an echo prediction coefficient α is determined so that likelihood is maximized for the feature quantity of a phoneme included in the speech signal selected in the transformed spectrum data. Various methods can be used for the setting, and a predetermined word or a predetermined sentence, for example, may be appropriately used for the determination. The determined echo prediction coefficient α, together with acoustic model data originally stored in the speech recognition device, is used to create adapted acoustic model data. The acoustic model data within the generated linear spectrum area is logarithmically transformed and inverse Fourier transformed to be a cepstrum, and the cepstrum is stored to perform speech recognition.

A case where a speech signal is a speech including an echo is now considered. It is known that, when an echo is superimposed onto speech, the speech signal O'(ω; t) with a frequency ω and a frame number t, which is observed at the current time point, is shown by the formula (2) below using a speech signal in the past O(ω; tp) ("A method of reverberation compensation based on short time spectral analysis" by Nakamura, Takiguchi, and Shikano, Processing of the meeting of the Acoustical Society of Japan, March 1998, 3-6-11).

[Equation 2]

$$O'(\omega;t) \cong S(\omega;t) \cdot H(\omega) + \alpha \cdot O(\omega;t-1) = \exp[\cos\{S_{cep}(c;t) + H_{cep}(c)\}] + \alpha \cdot O(\omega;t-1) \quad (2)$$

In the above formula, a standard acoustic model generated with a speech corpus and the like can be used in the present invention, and this is referred to as a clean speech signal in the present invention. A prediction value for transfer characteristic in the same frame is used for H. The α is an echo prediction coefficient showing the rate of an echo to be imposed from a frame in the past to the frame to be evaluated at the current time point. The subscript "cep" indicates a cepstrum.

Conventionally, acoustic model data used for speech recognition in the present invention is used instead of a reference signal. Furthermore, the intra-frame transfer characteristic H is acquired as a prediction value, and an echo prediction coefficient is determined using a speech signal selected based on the maximum likelihood reference to generate adapted acoustic model data.

When an echo is superimposed, the inputted speech signal and the acoustic model data are different only by the echo. In the present invention, attention has been focused on the fact that, in consideration of the long impulse response, an echo can be sufficiently simulated even if the echo is assumed to be superimposed onto a speech signal O(ω; t) to be determined at the current time point while being dependent on a speech signal O(ω; tp) in the immediately previous frame. That is, by using the formula (2) above to determine acoustic model data with the highest likelihood for a speech signal from a predetermined acoustic model data and the value of α, it is possible to use a corresponding language model data to perform speech recognition using only a speech signal from one channel.

Though addition of an intra-frame transfer characteristic H to acoustic model data can be performed by convolution in a spectrum area, transformation into a cepstrum area enables an addition condition to be satisfied. Therefore, if the intra-frame transfer characteristic H can be estimated by another method, it is possible to easily use additivity with acoustic model data to easily and accurately determine acoustic model data, which takes the intra-frame transfer characteristic H into consideration, through addition to data in the cepstrum area of acoustic model data already registered.

A set of parameters for an HMM of a clean speech signal S is indicated by $\lambda_{(s),\ cep}$, a set of HMM parameters for the intra-frame transfer characteristic H is indicated by $\lambda_{(h'),\ cep}$, and a set of HMM parameters for adapted acoustic model data is indicated by $\lambda_{(O),\ cep}$. In the present invention, attention is paid only to output probability distribution among acoustic model data, and $\lambda_{(s)}$ is shown as $\lambda_{(s)} = \{\mu_{j,k},\ O^2_{(s)j,k},\ W_{j,k}\}$, where $\mu_{j,k}$ is the mean value of the k-th output probability of a state j of a predetermined HMM, $O^2_{(s)j,k}$ is distribution, and $W_{j,k}$ is weight. These HMM parameters for acoustic model data are usually regarded as a cepstrum most suitable for speech recognition and applied to speech recognition.

As for estimation of an intra-frame transfer characteristic at step S12 in FIG. 3, in a particular embodiment of the present invention, for example, an intra-frame transfer function H can be used, which is acquired in the method described in "HMM-Separation-Based Speech Recognition for a Distant Moving Speaker" by T. Takiguchi, et al., IEEE Trans. on SAP, Vol. 9, No. 2, 2001, when it is assumed for convenience that there is no echo and α=0 is set. The intra-fame transfer function created can be subject to Discrete Fourier Transformation and indexation processing, then transformed to a cepstrum area, and stored in a storage area.

Furthermore, various methods can be used when the echo prediction coefficient α is calculated based on likelihood. In the particular embodiment described in the present invention, an EM algorithm ("An inequality and associated maximization technique in statistical estimation of probabilistic function of a Markov process", Inequalities, Vol. 3, pp. 1-8, 1972) can be used to calculate a prediction value for the maximum likelihood α'.

Calculation processing of an echo prediction coefficient α using the EM algorithm is performed by using the E step and the M step of the EM algorithm. In the present invention, a set of HMM parameters transformed into a linear spectrum area is used to calculate at the E step the Q function shown by the formula (3) below,

[Equation 3]

$$Q(\alpha' \mid \alpha) = E[\log Pr(O, s, k \mid \lambda_{(SH),lin}, \alpha') \mid \lambda_{(SH),lin}, \alpha] \quad (3)$$

$$\sum_p \sum_n \sum_{s_{p,n}} \sum_{m_{p,n}} \frac{Pr(O_{p,n}, s_{p,n}, m_{p,n} \mid \lambda_{(SH),lin}, \alpha)}{Pr(O_{p,n} \mid \lambda_{(SH),lin}, \alpha)} \cdot \log$$

$$Pr(O_{p,n}, s_{p,n}, m_{p,n} \mid \lambda_{(SH),lin}, \alpha')$$

In the above formula, the index of an HMM parameter (indicating a predetermined phoneme, for example) is indicated by p, the n-th observation series is indicated by $O_{p,n}$ related to a phoneme p, and a state series and a mixed element series for each $O_{p,n}$ are indicated by $s_{p,n}$ and $m_{p,n}$. The mean value, distribution and weight of the k-th output probability distribution (mixed Gaussian distribution) of a state j of a phoneme p of $\lambda_{(SH),lin}$ are shown as the expression (4) below.

[Equation 4]

$$\{\mu_{(SH),p,j,k}, \sigma^2_{(SH),p,j,k}, w_{(SH),p,j,k}\} \quad (4)$$

When the number of dimensions for each is indicated by D, if attention is paid only to the output probability distribution of the above Q function, then the Q function is shown as the formula (5) below.

[Equation 5]

$$Q(\alpha' \mid \alpha) = -\sum_p \sum_n \sum_j \sum_k \sum_t \gamma_{p,n,j,k,t} \left\{ \frac{1}{2} \log(2\pi)^D \sigma^2_{(SH),p,j,k} + \frac{\{O_{p,n}(t) - \mu_{(SH),p,j,k} - \alpha' \cdot O_{p,n}(t-1)\}^T \{O_{p,n}(t) - \mu_{(SH),p,j,k} - \alpha' \cdot O_{p,n}(t-1)\}}{2\sigma^2_{(SH),p,j,k}} \right\} \quad (5)$$

In the above formula, the frame number is indicated by t. The $\gamma_{p,n,j,k,t}$ is a probability given by the formula (6) below.

[Equation 6]

$$\gamma_{p,n,j,k,t} = Pr(O_{p,n}(t), j, k \mid \lambda_{(SH),lin}, \alpha) \quad (6)$$

The Q function is then maximized relative to α' at the M step (maximization) in the EM algorithm.

[Equation 7]

$$\alpha' = \mathrm{argmax}_{\alpha'} Q(\alpha' \mid \alpha) \quad (7)$$

The maximum likelihood α' can be obtained by partially differentiating the obtained Q by α' to determine the maximum value. As a result, the α' is given by the formula (8) below.

[Equation 8]

$$\alpha' = \frac{\sum_p \sum_n \sum_j \sum_k \sum_t \gamma_{p,n,j,k,t} \frac{O_{p,n}(t) \cdot O_{p,n}(t-1) - O_{p,n}(t-1) \cdot \mu_{(SH),p,j,k}}{\sigma^2_{(SH),p,j,k}}}{\sum_p \sum_n \sum_j \sum_k \sum_t \gamma_{p,n,j,k,t} \frac{O^2_{p,n}(t-1)}{\sigma^2_{(SH),p,j,k}}} \quad (8)$$

In the present invention, the α' can be estimated for each phoneme p. In this case, as given by the formula (9) below, the α' for each phoneme can be acquired by using a value before calculating the sum for the phoneme p.

[Equation 9]

$$\alpha'_p = \frac{\sum_n \sum_j \sum_k \sum_t \gamma_{p,n,j,k,t} \frac{O_{p,n}(t) \cdot O_{p,n}(t-1) - O_{p,n}(t-1) \cdot \mu_{(SH),p,j,k}}{\sigma^2_{(SH),p,j,k}}}{\sum_n \sum_j \sum_k \sum_t \gamma_{p,n,j,k,t} \frac{O^2_{p,n}(t-1)}{\sigma^2_{(SH),p,j,k}}} \quad (9)$$

Which echo prediction coefficient is to be used can be determined according to a particular device and a request such as recognition efficiency and recognition speed. It is also possible to determine α' for each HMM state similar to the formulae (8) and (9). By performing the calculation processing described above, an echo prediction coefficient α can be acquired only from a speech signal O(t) inputted from one channel away from a speaker using only parameters of the original acoustic model.

Figure 5:
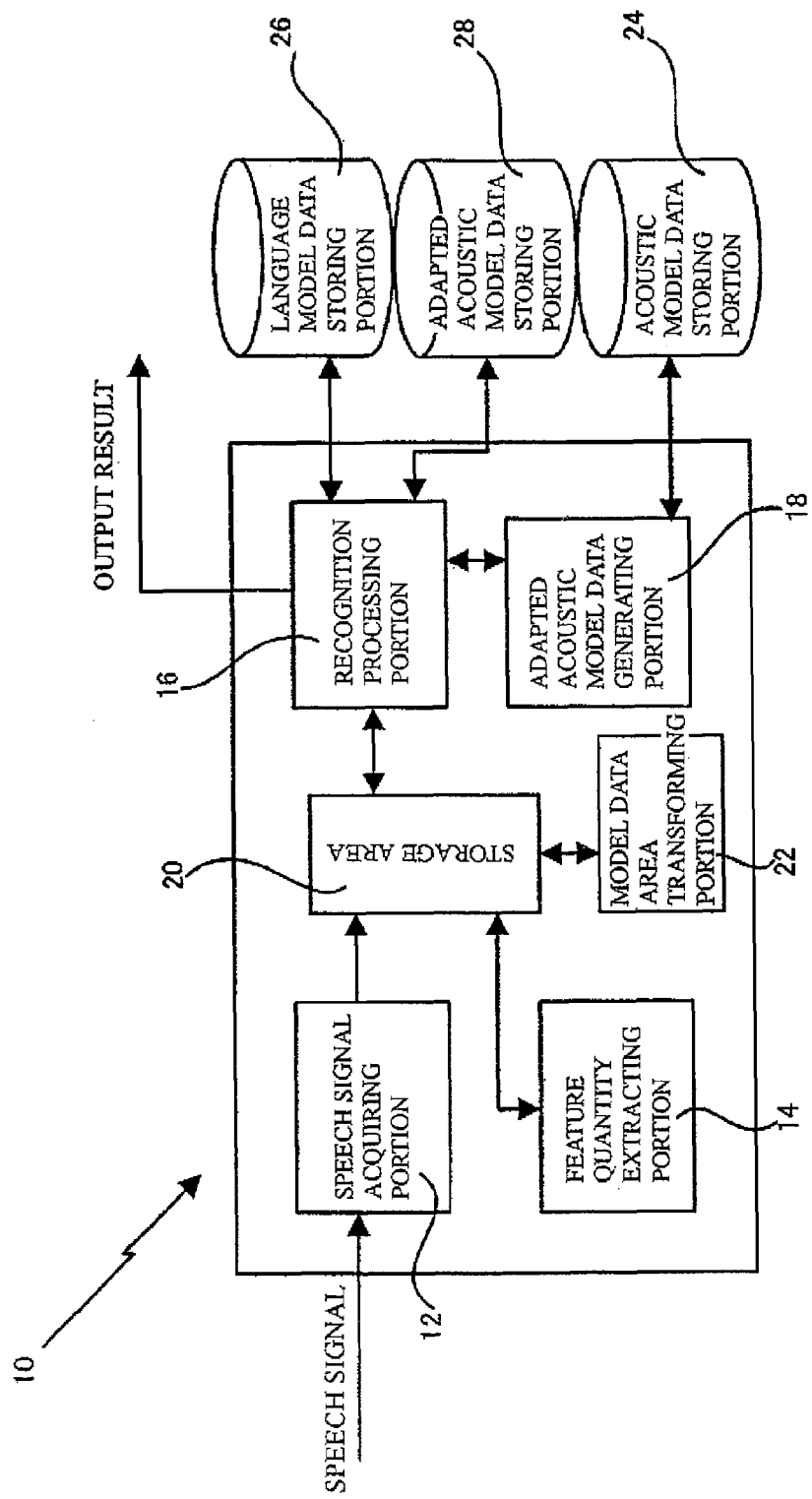
FIG. 5 is a schematic block diagram of a speech recognition device of the present invention.

C: Speech Recognition Device of the Present Invention and a Processing Method Thereof FIG. 5 shows a schematic block diagram of a speech recognition device of the present invention. The speech recognition device 10 of the present invention is generally configured with a computer including a central processing unit (CPU). As shown in FIG. 5, the speech recognition device 10 of the present invention comprises a speech signal acquiring portion 12, a feature quantity extracting portion 14, a recognition processing portion 16 and an adapted acoustic model data generating portion 18. The speech signal acquiring portion 12 transforms a speech signal inputted from inputting means such as a microphone (not shown) into a digital signal with an A/D transformer and the like, and stores it in a suitable storage area 20 with its amplitude associated with a time frame. The feature quantity extracting portion 14 is configured to include a model data area transforming portion 22.

The model data area transforming portion 22 comprises Fourier transformation means (not shown), indexation means and inverse Fourier transformation means. The model data area transforming portion 22 reads a speech signal stored in the storage area 20 to generate a cepstrum of the speech signal, and stores it in a suitable area of the storage area 20. The feature quantity extracting portion 14 acquires a feature quantity series from the generated cepstrum of the speech signal and stores it in association with a frame.

The speech recognition device 10 shown in FIG. 5 is configured to further include an acoustic model data storing portion 24 for storing acoustic model data based on an EM, which has been generated with the use of a speech corpus and the like, a language model data storing portion 26 for storing language model data acquired from a text corpus and the like, and an adapted acoustic model data generating portion 18 for storing adapted acoustic model data generated by the present invention.

The recognition processing portion 16, in the present invention, is configured to read adapted acoustic model data from an adapted acoustic model data storing portion 28, read language model data from the language model data storing portion 26, and use likelihood maximization to perform speech recognition for each read data based on the cepstrum of the speech signal.

Each of the acoustic model data storing portion 24, the language model data storing portion 26 and the adapted acoustic model data storing portion 28 may be a database constructed in a storage device such as a hard disk. The adapted acoustic model data generating portion 18 shown in FIG. 5 creates adapted acoustic model data through the above-mentioned processing in the present invention, and causes it to be stored in the adapted acoustic model data storing portion 28.

Figure 6:
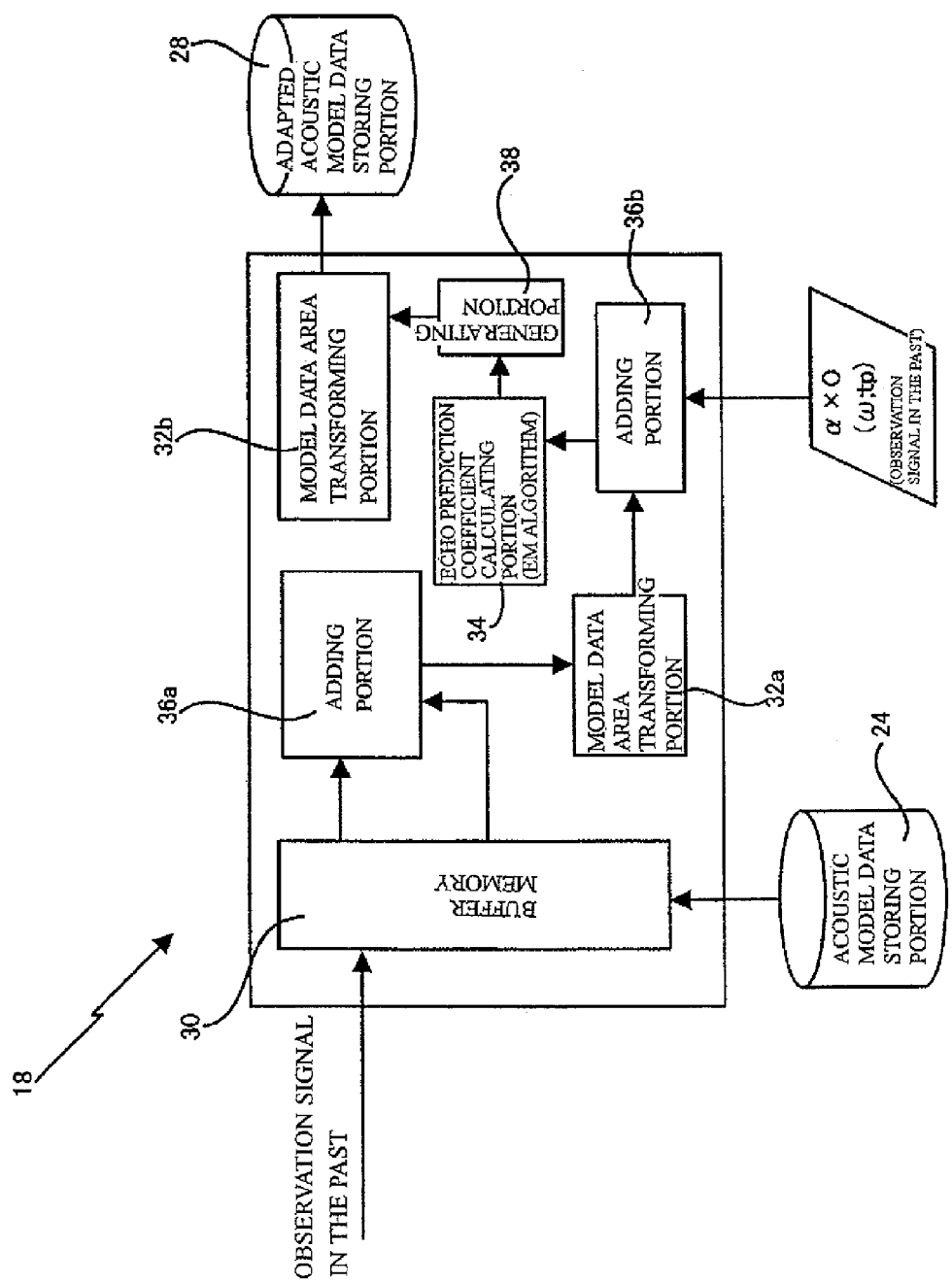
FIG. 6 shows a detailed configuration of an adapted acoustic model data generating portion used in the present invention.

FIG. 6 shows a detailed configuration of an adapted acoustic model data generating portion 18 to be used in the present invention. As shown in FIG. 6, the adapted acoustic model data generating portion 18 to be used in the present invention is configured to include a buffer memory 30, model data area transforming portions 32a and 32b, an echo prediction coefficient calculating portion 34, adding portions 36a and 36b, and a generating portion 38. The adapted acoustic model data generating portion 18 reads predetermined observation data older than the frame to be processed at the current time point, and multiplies it by an echo prediction coefficient α, and stores it in the buffer memory 30. At the same time, the adapted acoustic model data generating portion 18 reads acoustic model data from the acoustic model data storing portion 24, and reads the cepstrum acoustic model data of the intra-frame transfer characteristic H which has been calculated in advance from the storage area 20 and writes it to the buffer memory 30.

Since both of the acoustic model data stored in the buffer memory 30 and the intra-frame transfer characteristic data are cepstrum acoustic model data, these data are read into the adding portion 36a and addition is performed to generate a "speech model affected by intra-frame echo influence". The "speech model affected by intra-frame echo influence" is sent to the model data area transforming portion 32a to be transformed into linear spectrum acoustic model data, and then it is sent to the adding portion 36b. The adding portion 36b reads data obtained by multiplying observation data in the past by an echo prediction coefficient and performs addition to the linear spectrum acoustic model data of the "speech model affected by intra-frame echo influence".

The addition data generated at the adding portion 36b is sent to the echo prediction coefficient calculating portion 34 storing acoustic model data corresponding to a phoneme and the like selected in advance to determine an echo prediction coefficient α so that the likelihood is maximal, using an EM algorithm. The determined echo prediction coefficient α is passed to the generating portion 38 together with acoustic model data stored after being transformed into linear spectrum acoustic model data or still remaining linear spectrum, and created as adapted acoustic model data. The generated adapted acoustic model data is sent to the model data area transforming portion 32b, and is transformed from linear spectrum acoustic model data into cepstrum acoustic model data. After that, it is stored in the adapted acoustic model data storing portion 28.

Figure 7:
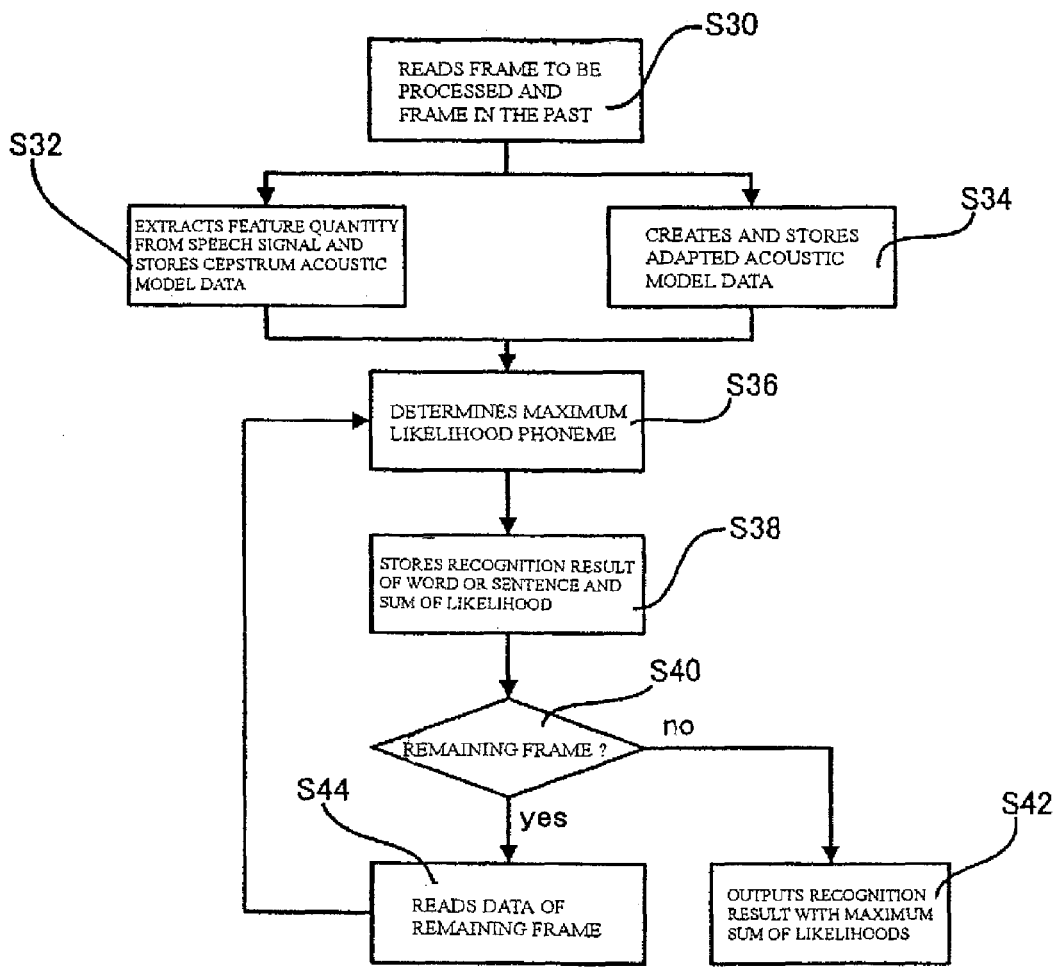
FIG. 7 is a schematic flowchart showing a process of a speech recognition method to be performed by a speech recognition device of the present invention.

FIG. 7 is a schematic flowchart showing a process of a speech recognition method to be performed by a speech recognition device of the present invention. As shown in FIG. 7, at step S30, the recognition process to be performed by the speech recognition device of the present invention acquires a speech signal superposed with an echo for each frame and stores in a suitable storage area at least the frame to be processed at the current time point and a preceding frame. At step S32, the process extracts a feature quantity from the speech signal, acquires data to be used for retrieval of the speech signal based on acoustic model data and language model data, and stores the data as cepstrum acoustic model data in a suitable storage area.

At step S34, which can be performed in parallel with step S32, a speech signal in a frame in the past and acoustic model data are read from a suitable storage area, transformation into a cepstrum area and transformation into a linear spectrum area are done to create adapted acoustic model data, and the data are stored in a suitable storage area in advance. At step S36, the adapted acoustic model data and the feature quantity acquired from the speech signal are used to determine a phoneme to which the maximum likelihood is to be given. At step S38, language model data are used based on the determined phoneme to generate a recognition result, and the result is stored in a suitable storage area. At the same time, the sum of likelihoods at the current time point are stored. After that, at step S40, it is determined whether there remains a frame to be processed. If there is no frame to be processed (no), then a word or a sentence for which the sum of likelihoods is maximal is outputted as a recognition result at step S42. If there is any frame yet to be processed, a "yes" determination at step S40, then at step S44, observation data for the remaining frame is read, and a feature quantity is extracted. The process is then returned to step S36, and recognition of the word or sentence is completed by repetition of the process.

Figure 8:
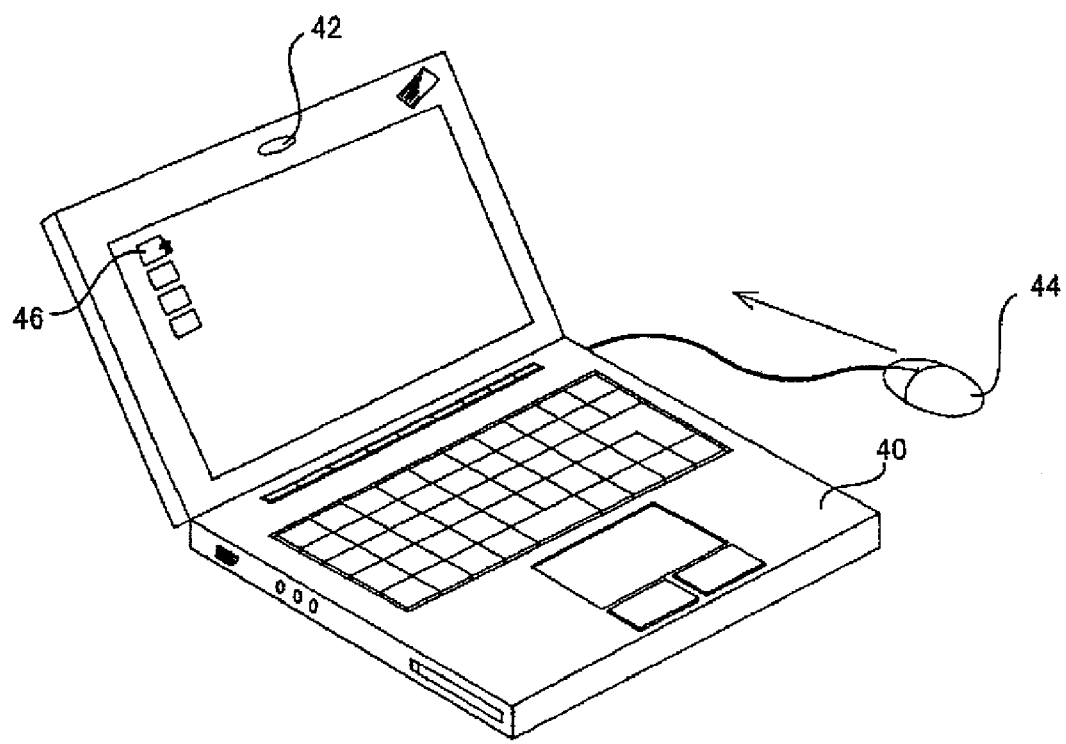
FIG. 8 shows an embodiment in which a speech recognition device of the present invention is configured as a notebook-type personal computer.
Figure 9:
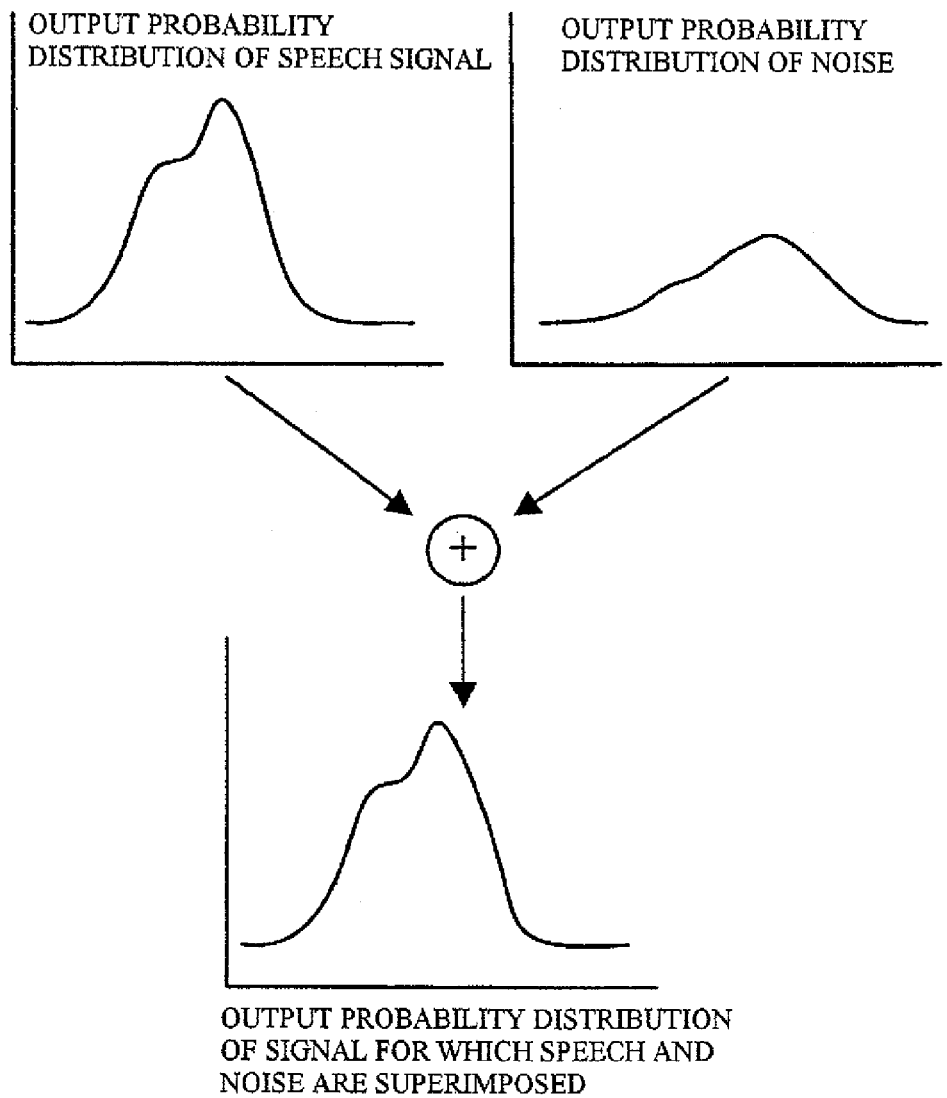
FIG. 9 shows a typical method in which noises are taken into consideration for speech recognition.

FIG. 8 shows an embodiment in which a speech recognition device of the present invention is configured as a notebook-type personal computer 40. An internal microphone 42 is arranged at the upper side of the display part of the notebook-type personal computer 40 to receive speech input from a user. The user moves a cursor displayed on the display part with pointer means 44 such as a mouse and a touch pad installed in office or at home to perform various processings.

It is now assumed that a user desires to perform dictation with word-processor software, for which software by IBM Corporation (ViaVoice: trademark registered), for example, is used, for speech recognition. When the user places the mouse cursor on an application icon 46 for activating application software and clicks the mouse 44, then the word-processor software is activated at the same time that the ViaVoice is activated. In the particular embodiment of the present invention, a speech recognition program of the present invention is incorporated in the viaVoice software as a module.

Conventionally, a user uses a head-set type microphone or a hand microphone to avoid the influence of echoes and environmental noises when inputting a speech. Furthermore, the user is required to input a speech by separately inputting environmental noises or echoes, and an input speech. However, according to the speech recognition method using the notebook-type personal computer 40 shown in FIG. 8 of the present invention, the user can perform dictation through speech recognition only by input into the internal microphone 42 in accordance with the present invention.

Though FIG. 8 shows an embodiment in which the present invention is applied to a notebook-type personal computer, the present invention is applicable to speech-interaction type processing in a relatively small space where influence of echoes is larger than that of continuous superposition of environmental noises, such as a kiosk device for performing speech-interaction type processing in a relatively small partitioned room, dictation in a car or a plane, and command recognition and the like, in addition the processing shown in FIG. 8. Furthermore, the speech recognition device of the present invention is capable of communicating with another server computer performing non-speech processing or a server computer suitable for speech processing via a network. The network described above includes the Internet using a communication infrastructure such as a local area network (LAN), a wide area network (WAN), optical communication, ISDN, and ADSL.

In the speech recognition method of the present invention, only speech signals continuously inputted in chronological order are used, and extra processing steps for separately storing and processing a reference signal using multiple microphones and hardware resources for the extra steps are not required. Furthermore, availability of speech recognition can be expanded without use of a head-set type microphone or a hand microphone for acquiring a reference signal as a "speech model affected by intra-frame echo influence"

Though the present invention has been described based on a particular embodiment shown in the drawings of the present invention, it is not limited to the described particular embodiment. Each functional portion or functional means is implemented by causing a computer to execute a program, and is not necessarily required to be incorporated as a component for each functional block shown in the drawings. Furthermore, as a computer-readable programming language for configuration of a speech recognition device of the present invention, the assembler language, the FORTRAN, the C language, the C++ language, Java® and the like are included. A computer-executable program for causing a speech recognition method of the present invention to be executed can be stored in a ROM, EEPROM, flash memory, CD-ROM, DVD, flexible disk, hard disk and the like for distribution.

D: Embodiment Example

The present invention is now described using a concrete example. An impulse response actually measured in a room was used to create a speech under echoes. A frame value corresponding to 300 msec was used as an echo time for the embodiment example, an reference example and a comparison example. The distance between a sound source and a microphone was set to be 2 m, and a speaking voice was inputted into the microphone from its front side. The sampling frequency of 12 kHz, the window width of 32 msec, and the analysis period of 8 msec were used as signal analysis conditions. A sixteen dimensional MFCC (Mel Frequency Cepstral Coefficient) was used as an acoustic feature quantity.

Since 8 msec was set for the analysis period, a speech signal in the past displaced by four frames was used for processing of an echo signal in order to prevent windows from being overlapped with each other. For each of the embodiment example, the reference example, and the comparison example, an input speech signal to be used was generated with fifty five phonemes. As for calculation of an echo prediction coefficient α, the maximum likelihood was calculated with the use of phonemes for one word among the inputted input signals. The obtained echo prediction coefficient α was applied to all the speech recognitions. The result of a recognition success rate obtained when five hundred words were recognized is shown below.

TABLE 1

|  | Embodiment example | Reference example | Comparison example 1 | Comparison example 2 |
| --- | --- | --- | --- | --- |
| Method | This invention | Takiguchi et al. | CMS | Without echo compensation |
| Recognition success rate | 92.8% | 91.2% | 86.0% | 54.8% |

As shown in Table 1 above, the result of the case without echo compensation (comparison example 2) was 54.8%. By comparison, the recognition success rate was improved to 92.8% by the present invention (embodiment example). This result is slightly better than the result of the reference example by Takiguchi et al. (the above mentioned "HMM-Separation-Based Speech Recognition for a Distant Moving Speaker" by T. Takiguchi, et al., IEEE Trans. on SAP, Vol. 9, pp. 127-140, No. 2, 2001) in which a reference signal and two-channel data are used. In the comparison example 1, in which the CMS method (Cepstrum Means Subtraction Method) is used, the recognition success rate was 86%, which is lower than the success rate of the embodiment example of the present invention. That is, it has been proved that, according to the present invention, a recognition success rate better than that of conventional methods can be provided though one-channel data is used therein.

The invention claimed is:

1. A speech recognition device configured to include a computer, the speech recognition device comprising:
   a component for receiving a speech signal and generating a plurality of frames comprising a first frame and a second frame, wherein the first frame precedes the second frame;
   a storage area for storing a feature quantity acquired from each frame;

storing portions for storing acoustic model data and language model data for each frame;

an echo adaptation model generating portion for:
  generating echo speech model data based at least in part on the first frame, the echo speech model data including at least one echo prediction coefficient indicative of an absolute value of an echo, and
  generating adapted acoustic model data based at least in part on acoustic model data for the second frame and the at least one echo prediction coefficient; and recognition processing means for utilizing a feature quantity acquired from the second frame, said adapted acoustic model data and language model data for the second frame to provide a speech recognition result for the second frame.

2. The speech recognition device according to claim 1, wherein the acoustic model data for the second frame comprises cepstrum acoustic model data, said echo adaptation model generating portion comprises:
  a model data area transforming portion for transforming the cepstrum acoustic model data into linear spectrum acoustic model data; and
  an echo prediction coefficient calculating portion for adding said echo speech model data to said linear spectrum acoustic model data to generate the at least one echo prediction coefficient giving the maximum likelihood.

3. The speech recognition device according to claim 2, further comprising an adding portion for generating echo speech model data; wherein:
  said adding portion adds the cepstrum acoustic model data and cepstrum acoustic model data of an intra-frame transfer characteristic to generate a speech model affected by intra-frame echo influence.

4. The speech recognition device according to claim 3; wherein:
  said adding portion inputs said generated speech model affected by intra-frame echo influence into said model data area transforming portion and causes said model data area transforming portion to generate linear spectrum acoustic model data of said speech model affected by intra-frame echo influence.

5. The speech recognition device according to claim 4; wherein said echo prediction coefficient calculating portion uses at least one phoneme acquired from the speech signal and said echo speech model data to maximize likelihood of the at least one echo prediction coefficient based on linear spectrum speech model data.

6. The speech recognition device according to claim 5, wherein speech recognition is performed using a hidden Markov model.

7. A speech recognition method for causing a speech recognition device configured to include a computer to perform speech recognition, the method causing the speech recognition device to execute steps of:
  receiving a speech signal and generating a plurality of frames comprising a first frame and a second frame, wherein the first frame precedes the second frame;
  storing in a storage area a feature quantity acquired from each frame;
  generating echo speech model data based at least on the first frame, the echo speech model data including at least one echo prediction coefficient indicative of an absolute value of an echo;
  generating adapted acoustic speech model data based on acoustic model data for the second frame and the at least one echo prediction coefficient and storing the adapted acoustic speech model data in the storage area; and
  processing a feature quantity acquired from the second frame, said adapted acoustic model data, and language model data for the second frame stored in a storing portion to generate a speech recognition result for the second frame.

8. The speech recognition method according to claim 7, wherein the step of generating said adapted acoustic model data comprises steps of:
  calculating by an adding portion a sum of the acoustic model data for the second frame and an intra-frame transfer characteristic value for the second frame; and
  reading said sum to transform cepstrum acoustic model data into linear spectrum acoustic model data.

9. The speech recognition method according to claim 8, further comprising:
  causing the adding portion to read and add said linear spectrum acoustic model data and said echo speech model data to generate the at least one echo prediction coefficient giving the maximum likelihood.

10. The speech recognition method according to claim 9, wherein the step of transformation into said linear spectrum acoustic model data comprises causing said adding portion to add cepstrum acoustic model data of said acoustic model data for the second frame and cepstrum acoustic model data of the intra-frame transfer characteristic value to generate a speech model affected by intra-frame echo influence.

11. The speech recognition method according to claim 10, wherein the step of generating said at least one echo prediction coefficient comprises a step of determining the at least one echo prediction coefficient so that a likelihood given to at least one phoneme for which the sum value of the speech model affected by intra-frame echo influence and linear spectrum echo model data of said echo speech model data is maximized.

* * * * *